United States Patent [19]
Barr et al.

[11] 4,176,873
[45] Dec. 4, 1979

[54] CAMPER TOP TENT ASSEMBLY

[75] Inventors: Dwight L. Barr; Leslie A. Barr; Benson P. Swett, all of San Diego; Charles M. Ray, La Mesa, all of Calif.

[73] Assignee: Barr Industries, Inc., Santee, Calif.

[21] Appl. No.: 846,887

[22] Filed: Oct. 31, 1977

[51] Int. Cl.² ............................................. B60P 3/34
[52] U.S. Cl. ................................. 296/156; 296/137 R
[58] Field of Search ............. 296/23 R, 23 A, 23 C, 296/23 G, 137 R; 135/1 A

[56] References Cited

U.S. PATENT DOCUMENTS

| 3,724,893 | 4/1973 | Giroux | 296/23 R |
| 3,753,590 | 8/1973 | Covix | 296/23 R |

*Primary Examiner*—Richard A. Bertsch
*Attorney, Agent, or Firm*—Brown & Martin

[57] ABSTRACT

A vehicle camper shell is provided with a pivotally mounted top that includes a tent assembly such that when the top is opened away from the compartment defined by the shell, the tent assembly opens up and provides a tent shelter assembly with a sleeping platform defined by the top. The sleeping area is defined solely by the pivoting top and the tent expands the compartment area to include a stand up area and a sleeping area.

29 Claims, 14 Drawing Figures

CAMPER TOP TENT ASSEMBLY

BACKGROUND OF THE INVENTION

The present invention relates generally to camper vehicles and pertains particularly to an expandable vehicle top that expands a compact vehicle compartment into a sleeping area and an adjacent standing area having adequate head room for standing.

Vehicles having over night sleeping accomodations are quite popular in many of the countries of the world. There are many types of vehicles having such sleeping accomodations.

One such vehicle includes van conversions which include the installation of sleeping accomodations within the van. The van may also include cooking and bathroom facilities. One drawback to such conversions is that for smaller vehicles, the floor area is limited to very narrow traffic ways due to the sleeping accomodations, such as bunks and the like. Head room is also generally restricted unless a top is adapted to rise, as in some installations. Other drawbacks include the fact that the vehicle has little utility outside of the specific camping adaptation.

Other camper constructions include camper shells or assemblies which are mounted on light trucks, such as pick up trucks. These campers are generally a fairly substantial structure that mount within the bed of the vehicle extending upward to give head room and forward over the cab of the vehicle to give additional sleeping and bunk space. Again, the vehicle has limitations as to the floor space, due to the bunks for sleeping. Additional drawbacks include the added weight to the vehicle because of the shell structure and top heavy nature of the structure due to its height.

Other sleeping accomodations exist such as in the form of suitcase like containers mounted on the top of automobile vehicles which are expandable into a tent structure extending over sleeping pads or mattresses contained within the container. These likewise have the drawback that there is no provision for cooking and bathing facilities and no floor area for standing and the like.

Accordingly, it is desirable that some camper sleep accomodating construction be available which overcomes the above problems of the prior art.

SUMMARY AND OBJECTS OF THE INVENTION

It is therefore the primary object of the present invention to overcome the above problems of the prior art.

Another object of the present invention is to provide a simple and inexpensive sleeping assembly for mounting on vehicles for expanding the compartment thereof into a sleeping area.

A further object of the present invention is to provide a camper assembly in the form of a camper shell that is expandable into a sleeping area and a stand up area and is compact and inexpensive.

In accordance with the primary aspect of the present invention, a sleeping assembly for a camper shell or the like includes a support frame for a pivoting top with a top pivotally mounted to the frame for opening the vehicle compartment into a sleeping compartment and a standing compartment, wherein the open top serves as the sleeping platform.

BRIEF DESCRIPTION OF THE DRAWINGS

The above and other objects and advantages of the present invention will become apparent from the following description when read in conjunction with the drawings, wherein.

DETAILED DESCRIPTION OF A PREFERRED EMBODIMENT

Figure 1:
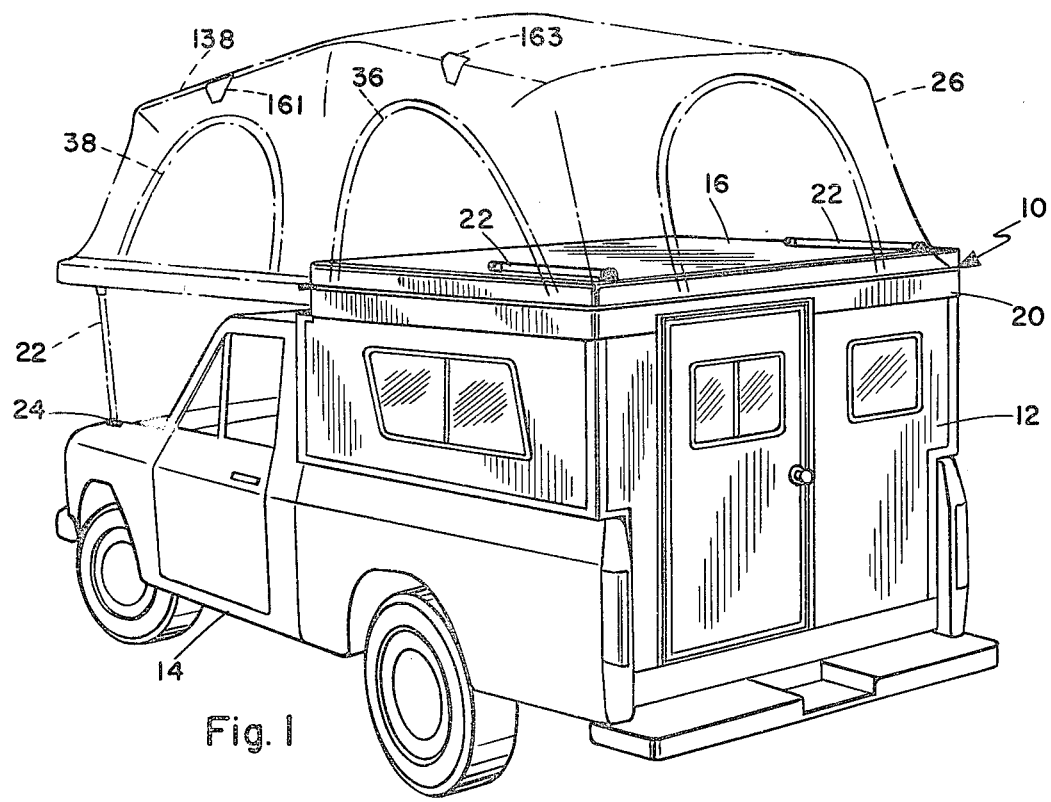
FIG. 1 is a perspective view of the camper bed unit mounted on a pick up truck, showing the closed and open positions.
Figure 2:
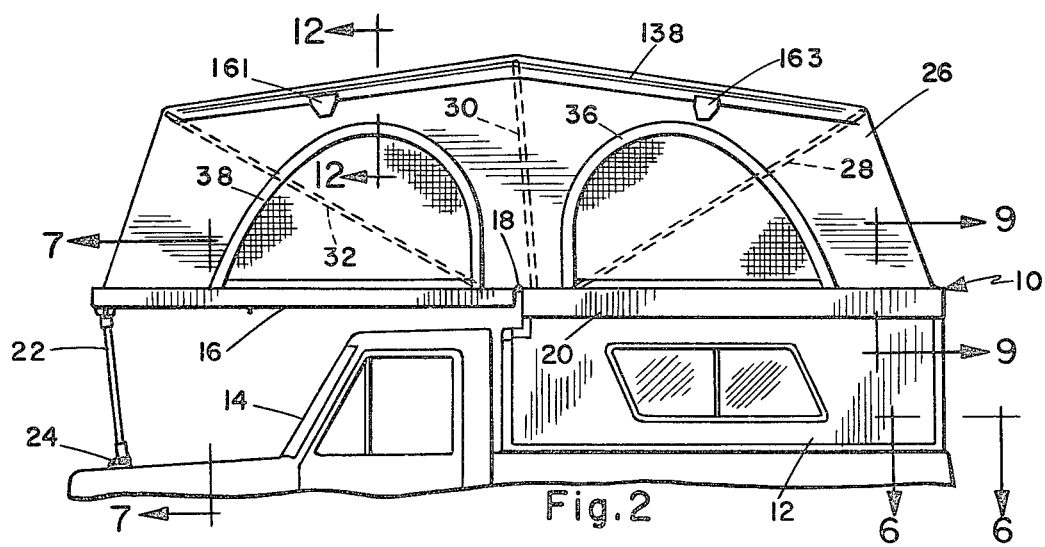
FIG. 2 is a side elevational view of the unit in open position.
Figure 3:
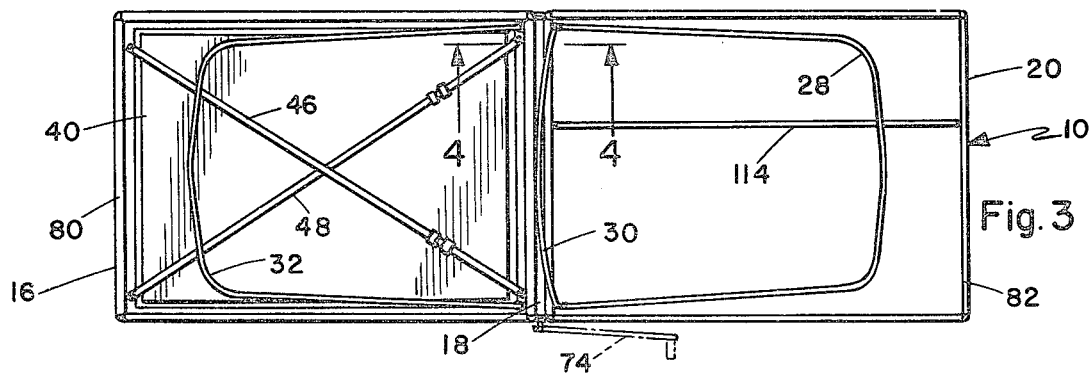
FIG. 3 is a top plan view of the unit with the canopy omitted.

Turning now to the drawings, particularly FIGS. 1 through 3, there is illustrated a camper top unit or assembly in accordance with the present invention, designated generally by the numeral 10, mounted on the top of a generally box-like camper shell 12 which in turn is mounted on a pick up truck 14. The camper top assembly comprises a generally flat rectangular top panel member 16 which is pivotally connected about a hinge or pivot axis 18 at one end of a generally rectangular open frame member 20 which is secured to or around the top of vertical walls defining the camper shell 12. The top 16 opens outward as shown in FIGS. 2 and 3, for defining a horizontal sleep platform extending outward over the cab of the truck. The top in its outwardly extended position, as shown in FIG. 2, is supported preferably by a pair of struts 22 pivotally connected at one end to the top 16 and detachably connected into a latch or bracket 24 mounted such as on the fender of the vehicle. The lower bracket 24 is slightly aft of the upper end of the strut when the vehicle is level so that gravity will pull the strut into the slot of the bracket. The struts preferably tilt at an angle of about 7 degrees when latched into the support position.

A tent assembly defined by a canopy 26 of a suitable thin flexible material shaped of suitable panels to define the desired configuration is secured around its lower edge to the frame 20 and to the top 16. This canopy is secured, as will be explained later, to mating faces of the frame and top along an inside edge of the mating faces.

The canopy is supported by ribs 28, 30 and 32, which are pivotally connected to suitable brackets, as will be described below, to the frame 20 and to the top 16. The canopy and support ribs are such as to automatically extend upon opening the top 16. The canopy 26 is provided with at least one end opening at 34 and side openings 36 and 38 for light, ventilation and the like.

This arrangement of the combination of the top or lid 16 and the frame 20 as mounted on a camper shell as shown, provides a simple, compact and inexpensive camper sleeping arrangement. The arrangement is such that, as will be described, the sleeping pad or mattress and the canopy and relating support structure is easily stowable within a compact space within the top of the shell 12. This provides an arrangement whereby a camper for over night sleeping accomodations is provided, yet is simple and compact such that no dangerous top heavy condition is provided. Moreover, the arrangement is such that the sleeping area is substantially divorced from the remaining compartment area of the shell 12, such that the shell provides, with the added height of the canopy, a walk space which may include cooking and showering facilities. With this construction, the shell 12 need be only high enough that the top 16 can clear the cab of the truck when opened.

An important feature of the invention is that the sleeping pad or mattress is entirely self-contained within the top of the camper shell. That is, a unitary sleeping pad and support is provided. In the illustrated embodiment a unitary mattress or pad 40, as shown in FIG. 3, is entirely self-contained within the unitary top 16. In the illustrated embodiment, the mattress completely fills the top and provides a full queen-size bed when adapted for a shell for a small pick up truck. Larger beds can be fitted into larger trucks. The illustrated pick up truck is for a long bed, small pick up truck, such that the top and frame is slightly shorter than the length of the pick up bed and the shell as shown in FIG. 2. Thus, the frame 20 and top 16 can be manufactured a standard size and fitted to a number of different sized shells and vehicles.

Figure 7:
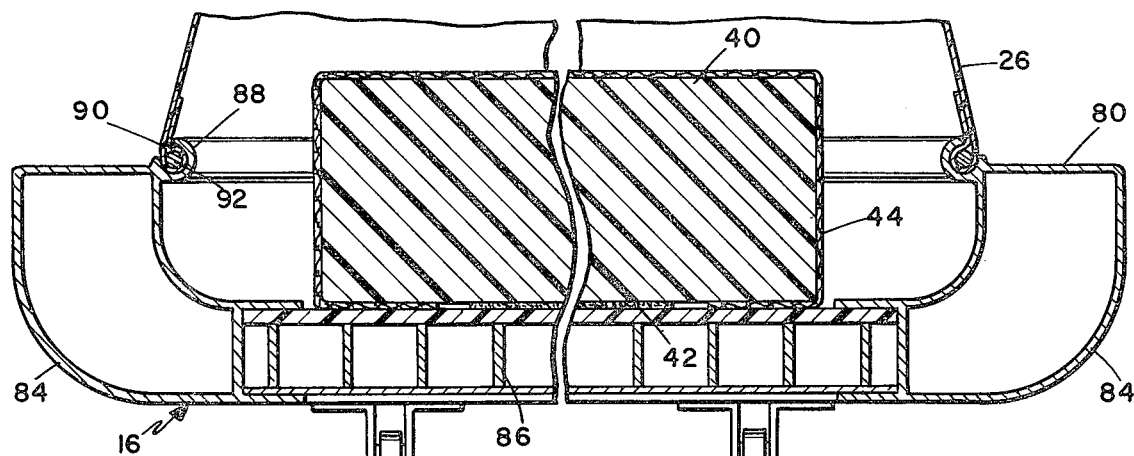
FIG. 7 is an enlarged sectional view taken on line 7—7 of FIG. 2.
Figure 8:
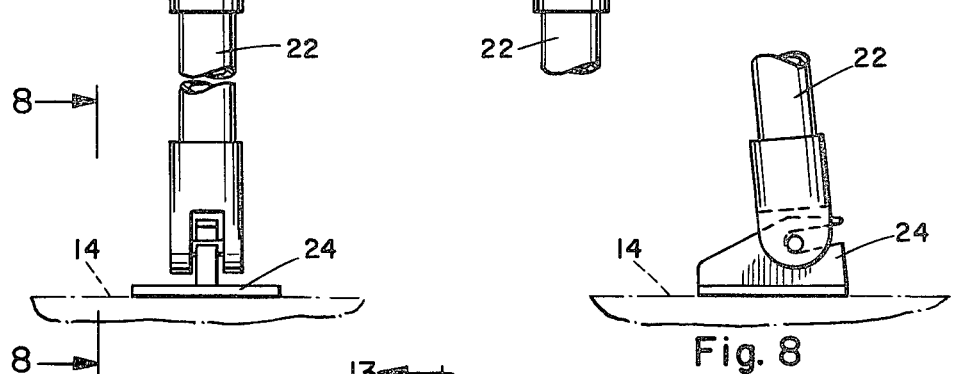
FIG. 8 is a view taken in the direction of arrows 8—8 of FIG. 7.

As best seen in FIG. 7, the mattress is glued directly to the top by means of a suitable coating of glue or other suitable adhesive at 42, which extends less than the entire surface area of the mattress, leaving a peripheral area between the top or inner surface of the top and the mattress pad for the edges of a mattress cover 44. With this arrangment a sufficient space is left around the edges of the mattress pad 40 to permit a mattress cover or pad to be fitted over the mattress and trucked underneath the pad between the pad and the top.

A pair of cross straps 46 and 48 are each connected at opposite ends to opposite ends of the top at opposite sides, and extend across the mattress for holding the bedding and the like to the mattress. The straps are preferably adjustable and may be of any suitable flexible material and are attached by means of detachable clips at at least one end thereof to the top. Thus, before the top is closed, that is pivoted back to a position over the camper shell, the straps may be extended across bedding, clothes and the like that are attached to the bedding or laying on the bedding and the straps fastened down. This will hold the bedding etc., in place on the top when it is being opened or closed and also provide a very convenient and compact storage of the bedding and clothing.

Figure 4:
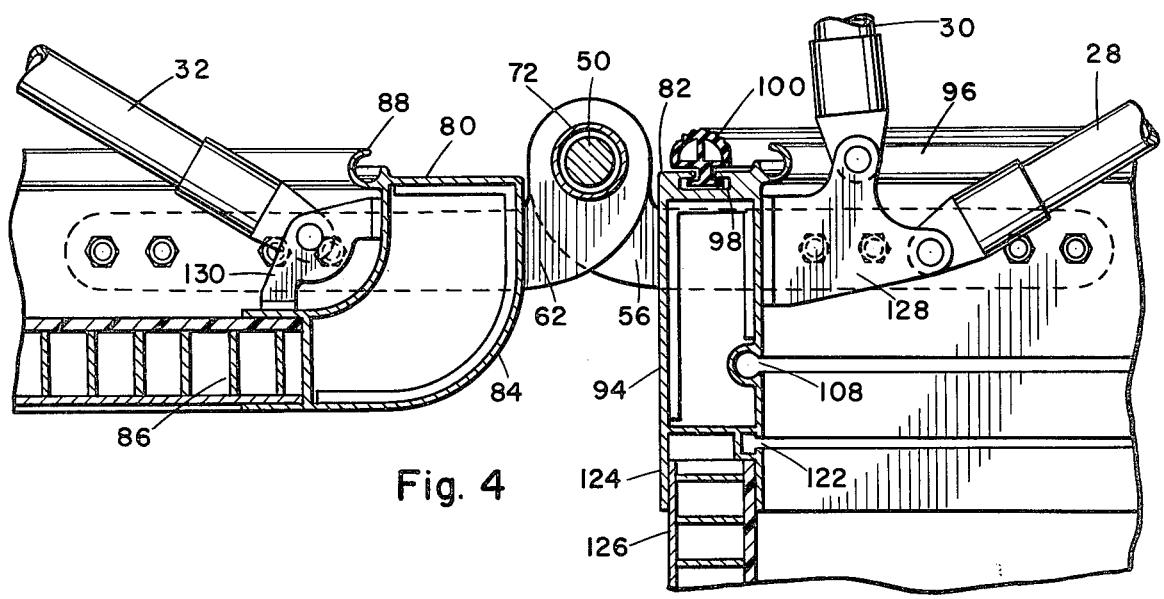
FIG. 4 is an enlarged sectional view taken on line 4—4 of FIG. 3.
Figure 5:
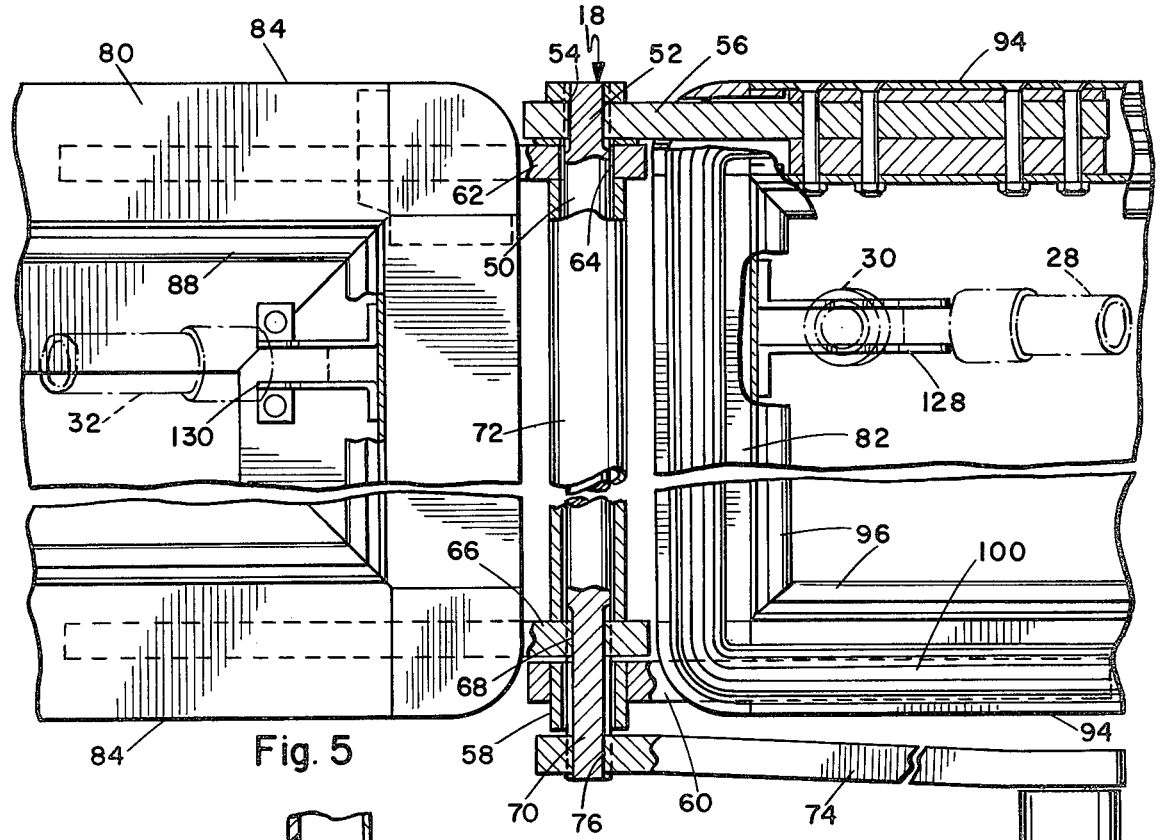
FIG. 5 is a top plan view of the structure of FIG. 4, with portions cut away to show the torsion bar and hinge attachments.
Figure 6:
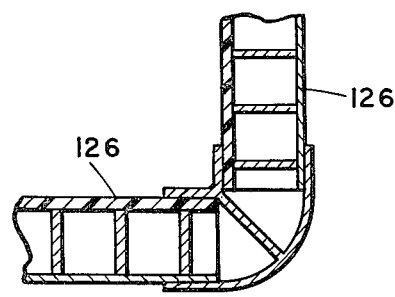
FIG. 6 is an enlarged sectional view taken on line 6—6 of FIG. 2.

Another feature of the invention is that the top is pivotally supported to the frame 20 by means of a torsion bar which neutralizes the load or weight of top, permitting easier and faster opening and closing of the sleeper top. As best seen in FIGS. 4 and 5, an elongated cylindrical torsion bar 50 includes a fixed splined end and a rotatably splined end with the fixed splined end 52 engaging a splined bore 54 in a hinge member 56, which in turn is fixed in a suitable manner, such as by bolts or rivets, to the frame member 20. The opposite or rotatable end of the torsion bar 50 is journalled in a suitable bearing 58 in a second fixed or stationary hinge member 60, which is likewise secured to the frame member 20. The top 16 includes a hinge member 62 secured thereto in a suitable manner such as by bolts or rivets, and includes a bore 64 journalling the hinge member to the torsion bar at one end and includes a second hinge member 66 with a splined bore 68 engaging splines 70 at the end of torsion bar 50. A tube 72 encloses the torsion bar 50 between the hinge members of the top.

The torsion bar 50 is thus splined at one end to a stationary hinge member 56 of the frame 20 and splined at the opposite end to hinge member 66 of the top. The top is thus pivotally or hingedly mounted on the torsion bar 50 which serves essentially as the hinge pin thereof. A removable handle 74 having a splined bore 76 and a hand grip 78 is detachably mounted on the rotatable end of the torsion bar 50, for rotating the top from the closed to the open positions. The torsion bar 50 is neutralized at the center or 90° position of the top with respect to the frame. With this arrangement, the torsion bar is tensioned both in the closed and opened positions for thereby counter-balancing the weight of the top in these two positions, for facilitating opening and closing of the top. With the weight of the top fully counter-balanced in the fully open and fully closed positions, it can be quickly and safely opened and closed with a simple handle.

The top 16 and the frame member 20 both have peripheral mating faces designated generally by the numerals 80 and 82 respectively. Turning especially to FIG. 7, the top is constructed of a frame defined by a plurality of extruded side rail members 84 connected together to define a generally rectangular frame arrangment. The top itself is constructed of a rigid panel, such as honeycomb or rigid foam sandwiched between sheets to define a panel 86 extending into grooves formed in the side rails 84. This provides a rugged light weight construction that also has good insulation characteristics. The extrusion that forms the side rails 84 is also shaped to form a plurality of tubular channels 88 extending around the periphery of the frame and inside the mating face 80. These tubular channels receive the lower edge of the canopy 26. The lower edge is secured in the open channels by means of a pocket or sleeve formed therein 90 in which is disposed one or more rods 92. The sleeves are inserted into place within the channels and the rods then inserted within the sleeve for retaining the lower edge of the sheet in position. The rods can be a plurality of rods of any suitable material, or they may be a continuous flexible rod, such as nylon or the like. The rod has a diameter that is sufficient (i.e., exceeds the width of the opening) to prevent pulling of the canopy material from the slot of the channel once in place.

Figure 9:
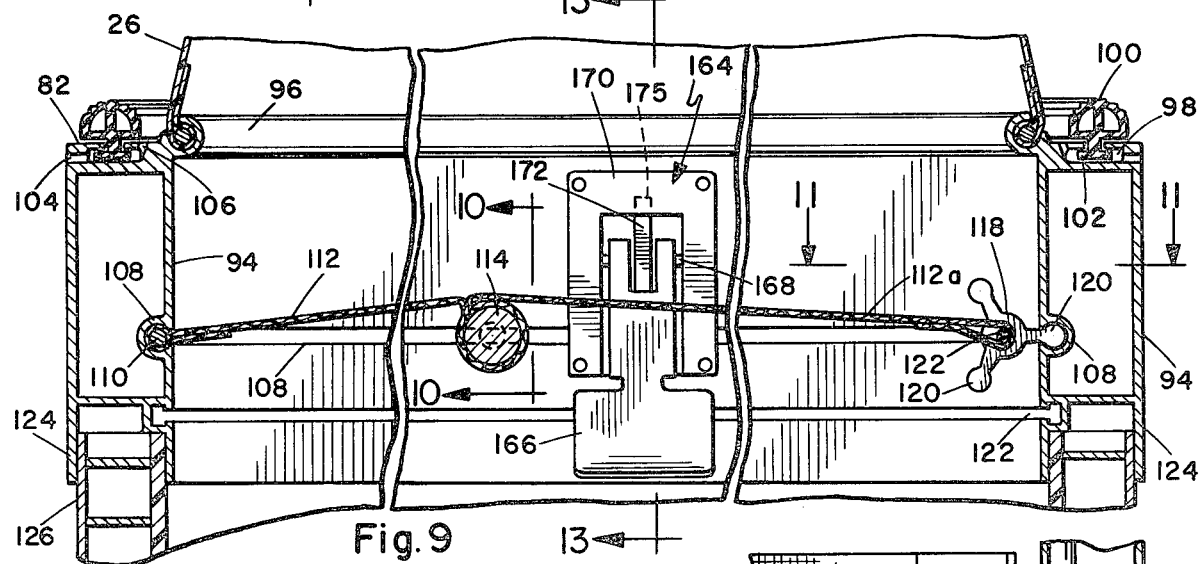
FIG. 9 is an enlarged sectional view taken on line 9—9 of FIG. 2.
Figure 10:
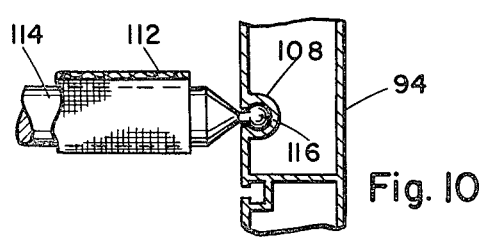
FIG. 10 is a sectional view taken on line 10—10 of FIG. 9.
Figure 11:
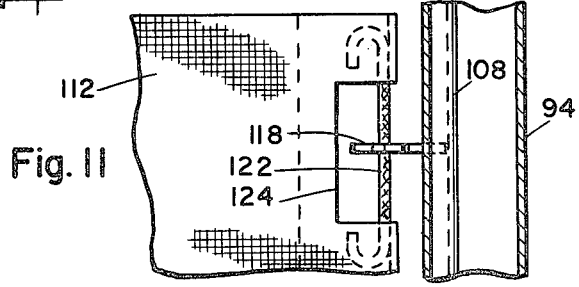
FIG. 11 is a sectional view taken on line 11—11 of FIG. 9.

The frame 20, as best seen in FIG. 9, is also constructed of a plurality of extruded box beams 94 which are connected together in a suitable manner, and form the generally rectangular frame 20. These box beams each include a tubular channel 96 for receiving the lower end of the canopy 26. The box beam 94 is also formed with a T-channel 98 in the face 82 thereof for receiving a generally T-shaped foot of a seal member 100. The foot 102 of the seal member is smaller than the T-channel thereby providing clearance for water flow by the foot. The seal member 100 is also constructed of a material having a density less than that of water such that it floats on the water when the channel is filled with water, therefore permitting the water to pass under the foot of the seal member and out a drain port 104 formed in the beam. An inlet drain port 106 is also formed on the inner side of the seal 100 to permit water caught inside the seal to drain through the channel and out the drain port 104. These drain ports are preferably disposed at each end of at least the side channels, such that the channel will drain under practically all circumstances.

Figure 13:
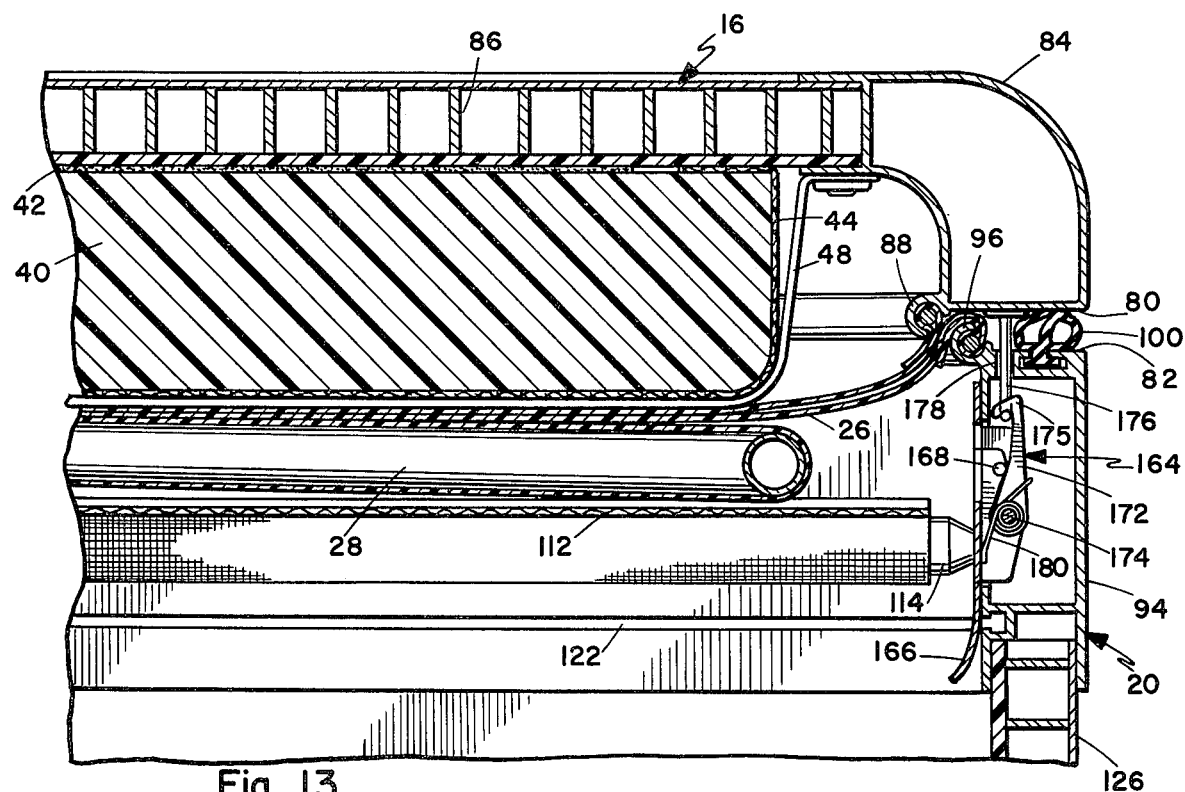
FIG. 13 is a sectional view taken on line 13—13 of FIG. 9, but showing the unit closed and latched.

As best seen in FIG. 13, when the top is placed in the closed position over the camper shell, the mating faces 80 and 82 of the top and the frame, come into substantial registration. The channel 88 of the top extends inboard of the channel 96 of the frame to provide clearance thereof. The mating face 80 of the top engages the seal member 100, which extends or runs around the entire periphery of the frame 20. The assembly is thereby sealed in the closed position.

Turning back now to FIG. 9 of the drawing, the box beam 94 is also provided with a tubular channel 108 on the inside thereof approximately midway between the top and bottom of the beam. This channel receives on one side a tubular sleeve portion 110 of a sheet 112 which forms an additional bunk, as shown in the top plan view of FIG. 3. The edge of the sheet is retained in channel by a rod inserted in sleeve 110. This sheet 112 is secured to a bunk pole 114 having spherical end 116 which extends into or is received in the channel 108 at the ends of the frame. The bunk pole or at least one end thereof is preferably telescoping to prevent binding in the channel 108. A detent is provided in the channel 108 at the position shown for receiving end for holding the bunk support rod 114 in the position as shown. An additional portion 112a of the sheet 112 extends beyond the bunk portion and is connected to the channel 108 on the opposite beam of the frame by means of a plurality of connectors 118.

These connectors, each preferably include three legs extending outward having a generally disc shaped end 120 at the outer end of each leg. The thickness of the connector or discs are such that they will slip through the slot into the channel 108 and when rotated 90° from the vertical, as shown in FIG. 9, are retained by the disc in the channel. The discs 120 can be inserted into the channel 108 when lying in a plane parallel thereto and are retained therein when rotated to lie in a plane 90 degrees thereto. The connectors 118 are mounted on a cord or the like 122, which extends or is sewn into the edge of the fabric of material 112 at a slot 124 thereof. This arrangement provides a liner, above which the top, including the mattress and sleeping blankets and the like are stored when the top is in the closed position.

The box beams 94 are also provided with a T-slot 122 which is conveniently positioned for receiving suitable mounting devices or the like for mounting curtains or the like for the camper shell. For example T-shaped sliders may be inserted in the slot and connected to curtains or the like. The beams at the lower end include an open channel construction at 124 which receives the upper end of the plurality of panels 126 of a sandwiched honeycomb construction, which define the upstanding sides or vertical walls of the camper shell. This arrangment, as previously mentioned, provides a rugged and lightweight construction and also provides a certain degree of insulation.

As best seen in FIG. 13, the canopy or tent assembly and bedding are stored above the sheet 112 of the camper shell in a compact and secure arrangment. The canopy support bows are pivotally mounted in brackets, as best seen in FIG. 4. The bows 28 and 30 are each mounted at each end in a pair of spaced apart double brackets 128. The double brackets 128 are secured in a suitable manner to the end walls to the frame member 20. The bow 32 is pivotally mounted at each end to brackets 130, which are connected or mounted within the top 16. The bracket is preferably secured in a known manner to the end frame members 84 of the top. These bows are secured to the top in a manner such that on the top automatically folds out upon opening the top, so that the top or canopy portion extends upward defining a tent arrangement as shown in FIGS. 1 and 2, covering the vehicle compartment and the sleeping area.

Figure 12:
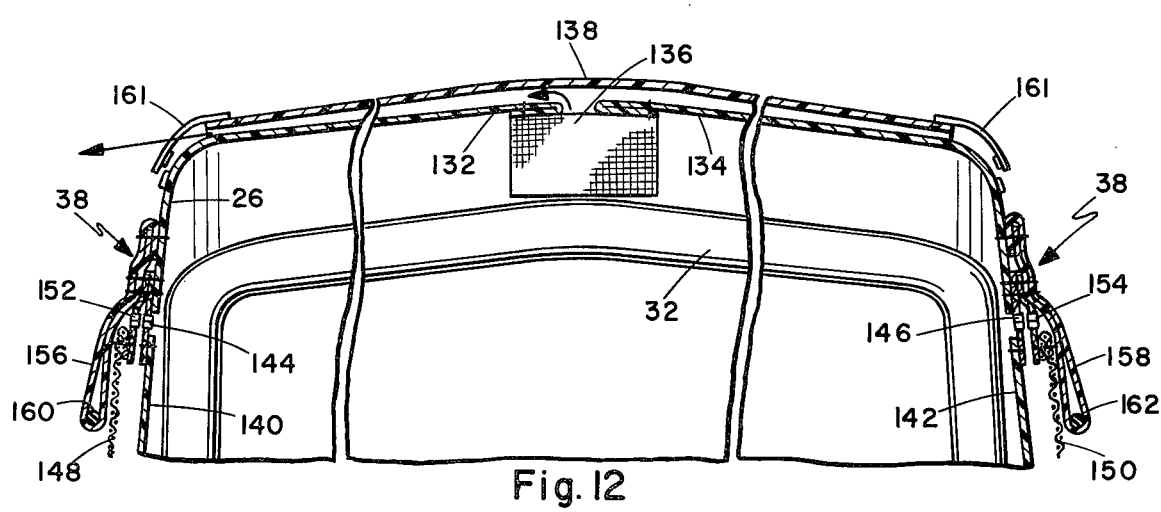
FIG. 12 is an enlarged sectional view taken on line 12—12 of FIG. 2.

The top 26 is constructed of a suitable pliable sheet material, which is preferably light weight, strong, durable and weather-tight or resistant. The cover or canopy is connected to the bows 28, 30 and 32 by straps so that the bows pivot up with opening of the top. In order to utilize an impervious sheet material, the top includes a unique vent assembly as best seen in FIG. 12. In this vent arrangment, the canopy or tent 26 is defined by a pair of upper panels 132 and 134, which are separated substantially along the center line of the axis of the vehicle defining an opening covered by a screen 136 connected between the two panels The opening is then covered by a center fly or sheet member 138 which overlaps the two sheets 132 and 134, covering the vent opening 136. With this arrangment, warm air within the enclosed tent assembly flows upward between the sheets 132, 134 by way of the opening through screen 136 and flows outward, as shown by the arrows, between the sheets 132, 134, and fly 138. The forces of the rising warm air will force the fly or sheet 138 upward permitting the air to flow therebetween. This arrangment permits the use of a light weight durable and impervious material, and provides an automatic vent of the tent. The slope from the center of the top prevents the leakage of rainwater under the center fly or sheet 138.

The side windows, as best seen in FIG. 12, each include a panel 140 and 142 of the tent material which are secured at the lower edges to the beam and to the tent material and secured by a zipper arrangment or the like, 144 and 146 within the opening defining the windows. With this arrangment, the panels 140 and 142 may be lowered by unzipping the zippers or fasteners 144 and 146. Screens 148 and 150 are similarly fastened within the window openings by means of suitable fasteners, such as zippers 152 and 154. These screens thus may also be lowered to increase air flow through the tent when desired. The zipper portions or fasteners of the openings are protected by overlapping flaps or the like 156 and 158, which preferably include resilient tension members 160 and 162 which draw the flaps downward in an overlapping position over the zipper. Thus, a well vented, weather proof tent assembly is provided.

Means in the form of straps 161 and 163 are secured to the edges of the fly and secure the fly down to the canopy by suitable fastener means such as Velcro fasteners. The straps are positioned above the windows and can be reached from inside the tent through the windows. These secure the fly down to keep wind from blowing in through the vent 136.

As best seen now in FIGS. 9 and 13, the top 16 is pulled down and secured into position in the closed position by means of a toggle latch, designated generally by the numeral 164. This toggle latch includes a hand lever 166 pivotally mounted at one end by means of pins 168 in a mounting bracket 170, which is secured to the inside of the channel member 94. This latch is preferably located approximately the center of the back wall of the vehicle beside the door. A latching hook 172 is pivotally connected by a pin 174 to the lever 166. The upper end of member 172 includes a hook portion 175 which hooks a U-bolt or the like 176, which is secured at its upper end to the frame member 84 of the top and extends down through a slot 178 in the upper surface of channel 94. A spring 180 biases the hook member 172 into hooking engagement with the U-bolt 176. The large over center throw of the toggle latch permits the top to be pulled down securely into sealing position with the seal and provide a secure latch of the top to the shell. Its location inside the shell increases the security of the shell.

Figure 14:
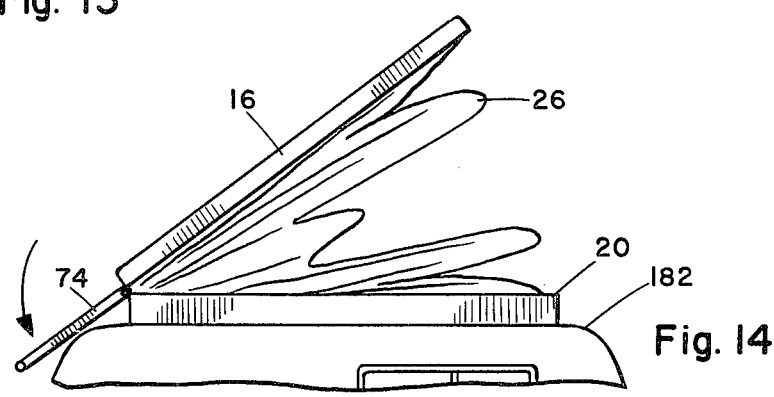
FIG. 14 is a side elevational view of the unit mounted on a van and partially opened.

Turning now to FIG. 14 of the drawing, there is illustrated the top construction of the present invention mounted on the top of a van 182. Thus, the top assembly of the present invention may be mounted on any suitable vehicle above a cargo or passenger compartment thereof. Some modification may be necessary in the mounting frame 20 in order for this to be accomplished. However, it is clear that with either type arrangment, the sleeping top arrangment of the present invention provides a vehicle compartment that expands into a living and sleeping space. Adequate headroom is provided directly above the compartment for standing, and the sleeping area is offset from the area of the compartment.

While the present invention has been illustrated and described by means of a specific embodiment, it is to be understood that numerous changes and modifications may be made therein without departing from the spirit and scope of the invention as defined in the appended claims.

Having described our invention, we now claim:

1. A vehicle camper top and bed support assembly comprising in combination:
   a generally rectangular open support frame extending around the top edge of the walls of a vehicle for defining an opening for supporting the top of the vehicle,
   a generally flat rectangular top having inside and outside faces and pivotally connected at one end to said frame about an axis that is transverse to the longitudinal axis of the vehicle on which said frame is mounted and pivotal between closed position for closing said opening, and an open position for defining a bed support for supporting a sleeping pad, and
   a sleeping pad secured by means of an adhesive directly to said inside face of said top and thereby movable therewith to said closed position and to said opened position so that said sleeping pad is retained and supported on said inside face when said top is in the closed position.

2. The camper top of claim 1, wherein said top is pivotally mounted on said frame by means of a cylindrical torsion bar which forms the pivot axis thereof.

3. The camper top of claim 2, wherein said torsion ar is connected with said torsion bar in the neutral position when said top is in the vertical position between open and closed.

4. The camper top of claim 3, wherein said torsion bar includes a stationary end mounted by splines in a bore in a bracket secured to one side of said frame and a rotatable end rotatably mounted in a bracket secured to the other side of said frame, and
   a detachable crank handle for rotating said torsion bar for pivoting said top between said open and closed positions.

5. The camper top of claim 1, including a tent assembly connected to said top and to said frame for opening with said top to its fully extended position, said test assembly including a flexible sheet canopy connected at its bottom edge in tubular channels formed along the inside edge of said frame and said top.

6. The camper top of claim 5, wherein said canopy includes a longitudinally extending vent in the top thereof.

7. The camper top of claim 6, wherein said canopy is defined at the top thereof by a pair of separate sheets extending toward the longitudinal center line of said canopy and terminating closely adjacent thereto for defining a longitudinal slit in the top of said canopy, and
   a sheet of material defining a fly extending longitudinally of said canopy covering said slit and extending to an overlapping position with respect to said first and second sheets to each side of said slit.

8. The camper top of claim 7, wherein said canopy is symmetric about a transverse axis.

9. The camper top of claim 8, wherein said fly extends substantially the full width of said canopy and substantially the full length thereof.

10. The camper top of claim 5, wherein said tent assembly is foldable into an area defined by said frame, and
    a liner extending across the area defined by the periphery of said frame for separating said tent assembly from said vehicle compartment.

11. The camper top of claim 10, wherein said liner is a high strength pliable material of a generally rectangular configuration having one end secured to one side of said frame and a mid portion thereof secured to a elongated support rod slideably mounted in said frame for defining a bunk.

12. The camper top of claim 11, wherein the opposite side of said liner is detachably connected in a groove in said frame, and
    said connecting means includes multiple armed central member having a plurality of arms extending outward thereof having circular discs thereon for detachably engaging said circular channel.

13. The camper of claim 5, wherein said top and said frame have means defining opposed peripheral faces when said top is in the closed position, and
    seal means mounted on said frame for sealing said top and said frame together when said top is in the closed position.

14. The camper of claim 13, wherein said frame is defined by an extruded box beam, said beam includes a circular channel formed at the upper inside corner thereof, and
    a T-slot extending along the upper face of said channel said seal means is mounted in a T-slot.

15. The camper of claim 14, wherein said seal is constructed of a low density material and is floatingly mounted in said T-slot so that water within said slot floats the seal member and passes therebeneath, and
a plurality of drain ports communicating with said T-slot for draining water from between the tent and seal and from the slot to the outside thereof.

16. The camper top of claim 1, wherein said frame and top is mounted on the top of a camper shell which is adapted to fit within the bed of a pick up truck,
said camper shell is of a generally box-like configuration having a forward end and a rearward end and including a door in said rear end, and
said top is pivotally connected at the forward end of said shell.

17. The camper top of claim 16, wherein said sleeping pad has an area substantially equal to the inside area of said top, and said pad is glued to said top by an adhesive that covers the area between said pad and said top just short of the edge of said pad for thereby permitting the extension of a pad cover beneath and between said pad and said top around the edges.

18. The camper top of claim 17 further including a pair of cross straps detachably connected at each end thereof to opposite ends of said top for extending across and retaining bedding and the like to the surface of said pad when said top is in the closed position.

19. A vehicle top and tent assembly comprising in combination:
a generally rectangular open support frame for extending around the open top of a vehicle compartment,
a generally rectangular top pivotally mounted at one end to said support frame for pivotal movement between open and closed positions,
a tent assembly including a canopy connected at its lower peripheral edge to around the edge of said frame and said top and foldable to a collapsed position when said top is closed and opening automatically with opening of said top to a fully extended position, including support bows pivotally mounted in said frame and said top for supporting said tent, and
said tent including automatic venting means including an elongated vent opening and an elongated pliable sheet overlying said vent opening for automatically rising in response to warm air within said tent for permitting said warm air to escape the interior of said tent for ventillation thereof.

20. The vehicle top assembly of claim 19, wherein said top pens to a horizontal position for defining a sleep platform and includes a mattress covering the entire inner surface of said top.

21. The top assembly of claim 19, wherein said top assembly is mounted on a vehicle wherein said top is pivotally connected to said frame about an axis transverse to the longitudinal axis of said vehicle, and
said vent comprises a slit in said canopy extending along the longitudinal axis of said vehicle and said vent cover comprises a generally rectangular sheet connected at both ends thereof to said tent and covering said slit.

22. The top assembly of claim 21 wherein said tent is symmetrical about said transverse axis.

23. The vehicle top of claim 22, wherein said frame is mounted on the top of a camper shell having a generally box like configuration adapted to be mounted on a pick up truck, and said camper shell includes a front end and a back end and a door in said back end, and wherein said top and tent assembly opens out to provide standing space with head room within the confines of said camper shell and a sleeping platform forward of and closely adjacent thereto.

24. The vehicle top assembly of claim 23, wherein said top is secured in the closed position by means of a toggle clamp, said toggle clamp including a hand lever and a hook mounted inside said camper shell and a U-bolt mounted in said top for engagement by said hook.

25. The vehicle top of claim 19 wherein said frame is mounted on a van, and
said top is mounted for pivoting about an axis transverse to the longitudinal axis of the van.

26. A vehicle top and tent assembly comprising in combination:
a generally rectangular open support frame for extending around he open top of a vehicle compartment,
a generally rectangular top pivotally mounted at one end to said support frame for pivotal movement between 180 degree horizontal open and closed position,
a cylindrical torsion bar secured at one end to said support frame and at the other end to said top for pivotally supporting said top and for counterbalancing said top at the fully open position and at the fully closed position, and
a tent assembly including a canopy connected at its lower peripheral edge to around the edge of said frame and said top and foldable to a collapsed position when said top is closed and opening automatically with opening of said top to a fully extended position, said tent assembly including a plurality of support bows pivotally mounted in said frame and said top for supporting said tent.

27. The vehicle top assembly of claim 26, wherein said top opens to a horizontal position for defining a sleep platform and a mattress secured directly to and covering the entire inner surface of said top.

28. The top assembly of claim 26, wherein said top assembly is mounted on a van wherein said top is pivotally connected to said frame about an axis transverse to the longitudinal axis of said vehicle, and
said canopy includes a vent comprising a slit in said canopy extending along the longitudinal axis of said vehicle and said vent cover comprises a generally rectangular sheet connected at both ends thereof to said tent and covering said slit.

29. The vehicle top and tent assembly of claim 26 including:
having an upper and a lower end pivotally connected at the upper end to said top for supporting said top in the open position, and
latch means engageable with the lower end of said strut means for latching said top in the open position, said latch means being slightly offset from the upper end of said strut when said top is level so that said strut means is pulled by gravity into said latch means.

* * * * *